United States Patent [19]
Shtivelman

[11] Patent Number: 5,926,539
[45] Date of Patent: Jul. 20, 1999

[54] METHOD AND APPARATUS FOR DETERMINING AGENT AVAILABILITY BASED ON LEVEL OF UNCOMPLETED TASKS

[75] Inventor: Yuri Shtivelman, Belmont, Calif.

[73] Assignee: Genesys Telecommunications Laboratories, Inc., San Francisco, Calif.

[21] Appl. No.: 08/928,211

[22] Filed: Sep. 12, 1997

[51] Int. Cl.[6] .................................................. H04Q 3/64
[52] U.S. Cl. ................... 379/266; 379/88.22; 379/93.24
[58] Field of Search ..................................... 379/265, 266, 379/309, 88.13, 88.22, 93.24, 100.08, 209; 395/200.36, 200.37, 672, 682

[56] References Cited

U.S. PATENT DOCUMENTS

| | | | |
|---|---|---|---|
| 5,333,266 | 7/1994 | Boaz et al. ............................. | 379/93.24 |
| 5,530,740 | 6/1996 | Irribarren et al. .................... | 379/93.24 |
| 5,721,770 | 2/1998 | Kohler .................................... | 379/266 |
| 5,764,898 | 6/1998 | Tsuji et al. ............................ | 379/93.24 |
| 5,793,861 | 8/1998 | Haigh ..................................... | 379/266 |
| 5,796,791 | 8/1998 | Polcyn .................................... | 379/266 |
| 5,872,841 | 2/1999 | King et al. ............................. | 379/209 |

*Primary Examiner*—Scott Wolinsky
*Attorney, Agent, or Firm*—Donald R. Boys

[57] ABSTRACT

A software routine for a multimedia-capable call center checks for active status of the telephone, active communication with clients via a computer station available to an agent, and the level of uncompleted tasks in a storage system adapted for listing tasks for an agent to complete, such as messages to answer. The software routine returns Agent Busy if there is an active network call or the level of uncompleted tasks is above a preset level, and Agent Available if there are no active network calls and the level of uncompleted tasks is at or below the preset level. The software routine is adapted to operate with call-center management software including Computer-Telephony Integrated (CTI) systems wherein CTI servers are connected to telephony switches to provide enhanced functionality.

11 Claims, 2 Drawing Sheets

METHOD AND APPARATUS FOR DETERMINING AGENT AVAILABILITY BASED ON LEVEL OF UNCOMPLETED TASKS

FIELD OF THE INVENTION

The present invention is in the field of multimedia communications and has particular application to communication software routines that report real-time status of an agent as it applies to the availability of that particular agent within a call center.

BACKGROUND OF THE INVENTION

As Computer Integrated Telephony (CIT) systems become more sophisticated, and multimedia communication becomes more pervasive, increasingly sophisticated call centers are being developed wherein multimedia communication of many sorts is used by agents in addition to conventional telephony techniques. Companies are developing multimedia communication methods and are beginning to integrate these methods within the call center environment. These developments have produced a new breed of multimedia agent to handle communication with the aid of advanced software-communications programs. Agents within call centers who once handled only telephone communications are now required to handle a variety of communications such as, but not limited to E-mail, Video mail, Video calls, and data network calls such as Internet protocol telephony (IPT) calls.

A multimedia agent for purposes of this specification is an agent in a call center charged with handling various communications transactions, and who has access to multi-communication mediums, hence, the term multimedia. A multimedia agent may work in a call center set up for technical service, sales, management, or for any other purpose for which call centers are used.

As described above, many of the newer mediums of communication that may be employed by a multimedia agent involve some type of computer integration. In such call centers agents are typically provided with computerized workstations, including a computer, which may be a personal computer, and a video display unit, hereinafter PC/VDU. In such call centers known to the present inventor, the agents' PC/VDUs are interconnected on a local area network (LAN), which may also connect to one or more processors in turn connected to a telephony switch to which the agents telephones are connected. Through sophisticated computer techniques integrated with the requisite hardware, multimedia capability for the agents is achieved.

A multimedia agent working in a call center such as described above is assigned to a workstation as described, and the workstation, together with software accessible on the LAN presents graphic user interfaces (GUIs) for displaying information relating to each communication transaction handled by that particular agent. For example, along with normal phone capabilities, the agent may be capable of sending and receiving E-mail, Video mail, and the like. Video conferencing may also be a part of an agent's transaction protocol. Similarly, a caller to such an agent may have a PC connected on-line, or to a network accessible to the agents, and thus be enabled to send and receive E-mail, video calls, or any other multimedia communication that the agent may host. As well, callers may be accessing the agent from a normal analog telephone where only voice mail capabilities and conventional telephony audio services are utilized.

Call routing to and within call centers involves computerized platforms and software dedicated to directing a caller to an appropriate agent for the purpose of fulfilling the purpose of the caller Such routing is known to the present inventor as agent-level call routing. Routing of calls, then, may be on several levels. Pre-routing may be done at Service Control Points (SCPs) and further routing may be, and typically is, accomplished at individual call centers. A call center typically involves a central switch, which may be, for example, a Private Branch Exchange (PBX), or PSTN switch. The central switch is connected to the public-switched telephone network (PSTN), as is well-known in the art. Agents, trained to handle customer service, occupy agent stations connected by telephone lines to the central switch, and connected in this example to file servers and the like on a LAN.

In a broad, general, and conventional sense, when a call center is routing an incoming call to an agent there are two common results experienced and reported to the system. One is that the agent is busy on a phone call. The routing routine in this instance typically reports that the agent is busy and the call is routed to the next available agent. Often a call is arbitrarily routed to a busy agent even though a free agent is available to answer the call. The other result is that the agent is determined to be available and the call is routed to that particular agent. In some systems incoming calls are dumped into a general queue to be answered by a next available agent with no routine to determine whether or not an agent is busy, and no more sophisticated routing.

As described above, multimedia communication methods are emerging as applicable methods of communication within call centers. For example, E-mail programs, video calls, IPT calls, and the like can be utilized by agents in addition to voice mail and more conventional connection. In some cases agents are also connected to the Internet for purposes of communicating with other agents, accessing additional information not hosted in the call center, or even for the purpose of contacting or responding to Internet-sourced inquiries. It is to such multimedia-capable call centers that the present invention is addressed.

It is clear to the present inventor that in a multimedia-capable call center, in conventional agent-level routing, an agent will be determined by control routines to be busy (unavailable for further routing) if he or she is engaged on a telephone call or a video call. These activities can be automatically determined by checking the agent's telephone line, and in some cases his/her computer terminal. It is also clear to the present inventor that this determination is insufficient for such a call center, and may well cause unwanted difficulty. An agent in such a call center will have a job description beyond engaging in customer calls. He or she must also answer e-mails, voice-mails, video-mails and the like. In the event further calls continue to be routed to an agent who is charged with answering waiting e-mails and the like, the part of the agent's responsibilities relating to answering such mails may never be adequately met.

What is clearly needed is a determination method and system by automatic control routine that will determine whether or not an agent is busy with respect to all of the agent's responsibilities, including active calls and level of dealing with accumulating e-mails, other multimedia messages and the like.

SUMMARY OF THE INVENTION

In a preferred embodiment of the present invention a method for determining Busy/Available status for an agent at an agent station in a call center is provided, comprising steps of (a) checking for a live network call at the agent station; (b) checking an e-task queue at the agent's station for uncompleted tasks; and (d) determining the agent is available only if there is no ongoing live network call, and the level of uncompleted e-tasks in the e-task queue is below a predetermined level. The queue may store one or more of e-mail messages, voice mail messages, video messages, and any other type of electronic messages in any type of format (Multimedia). It may also store tasks of other sorts deemed to be in the scope of the agent's responsibilities.

In another aspect, in a call center wherein agent activities to be performed other than communication with clients are monitored electronically, a method is provided for determining an agent in a call center is one or the other of busy or available, comprising steps of (a) determining if the agent is engaged in a live network call (phone, video, or Internet); (b) setting a comparison level for uncompleted activities other than communication with clients for the agent; and (c) determining that the agent is available only if the agent is not involved in a live network call and the level of uncompleted activities in the electronic task list is below the preset comparison level. In this method activities other than communication with clients (tasks) involve answering stored e-mails, and the level of uncompleted activities comprises a number of unanswered e-mail messages.

In another aspect a telephony system adapted to accomplish agent-level routing is provided, comprising a router adapted for selecting a best-fit agent at an agent station for receiving an incoming call; and a call routine for determining if the best fit agent is available or busy. In this aspect the agent is determined to be available only if the agent is not involved in a live network call and a level of uncompleted tasks monitored electronically is below a preset comparison level. The router and the call routine may operate at a call center comprising a telephony switch through which calls to agents are routed, and the call routine may executed on a computer-telephony integration (CTI) server connected to the telephony switch.

In yet another aspect a multimedia-capable call center is provided, comprising a telephony switch having a trunk line for incoming calls and connected to telephones at agent stations; a computerized management system for operating the call center; computer stations with video display units (PC/VDUs) at individual ones of the agent stations, the PC/VDUs connected on a local area network (LAN) coupled to the telephony switch; a storage system wherein a task list is stored for an agent to complete, and wherein the level of uncompleted tasks is accessible to the management system; and a routine adapted for determining Busy/Available status for an agent. In this the routine determines an agent as available only if the agent is not engaged in a live network call and the level of uncompleted tasks is below a preset level. Tasks for an agent may include messages stored for an agent to answer, such as voice mail, e-mail, video mail messages, and any other type of message (Multimedia).

In yet another aspect a software routine for determining agent status in an agent-level routing system having an agent station equipped with a telephone and a computer station for communicating with clients, and a storage system for storing uncompleted tasks for the agent station is provided, the software routine comprising a protocol for determining active status of the telephone; a protocol for checking for live network calls with clients via the computer station; and a protocol for determining level of uncompleted tasks in the storage system. The software routine returns Agent Busy if there is an active network call or the level of uncompleted tasks is above a preset level, and Agent Available if there are no active network calls and the level of uncompleted tasks is at or below the preset level. In this aspect the protocol for checking for uncompleted tasks checks for one or more of voice mail, e-mail, video mail messages, and any other type of message (Multimedia) left for the agent at the station to handle.

The unique ability in various embodiments of the present invention to return a determination of Agent Busy or Agent Available based on more than the active network call status at an agent station for the first time takes into account activities an agent may be responsible to accomplish beyond the conventional responsibility of handling live network calls from clients. This new ability is especially suited to state-of-the-art call centers and centers being developed wherein capability is extended to multimedia communication, such as e-mails, video mails and the like.

BRIEF DESCRIPTION OF THE DRAWING FIGURES

DESCRIPTION OF THE PREFERRED EMBODIMENTS

In telephony operations utilizing agent-level routing, when it is necessary to determine if an agent is busy or available a routine is called for that purpose. Such a routine in conventional art directs the associated system to check the agent's equipment to determine if the agent is engaged in an active voice call. As described above in the background section, this well may not be adequate as call center sophistication increases.

Figure 1:
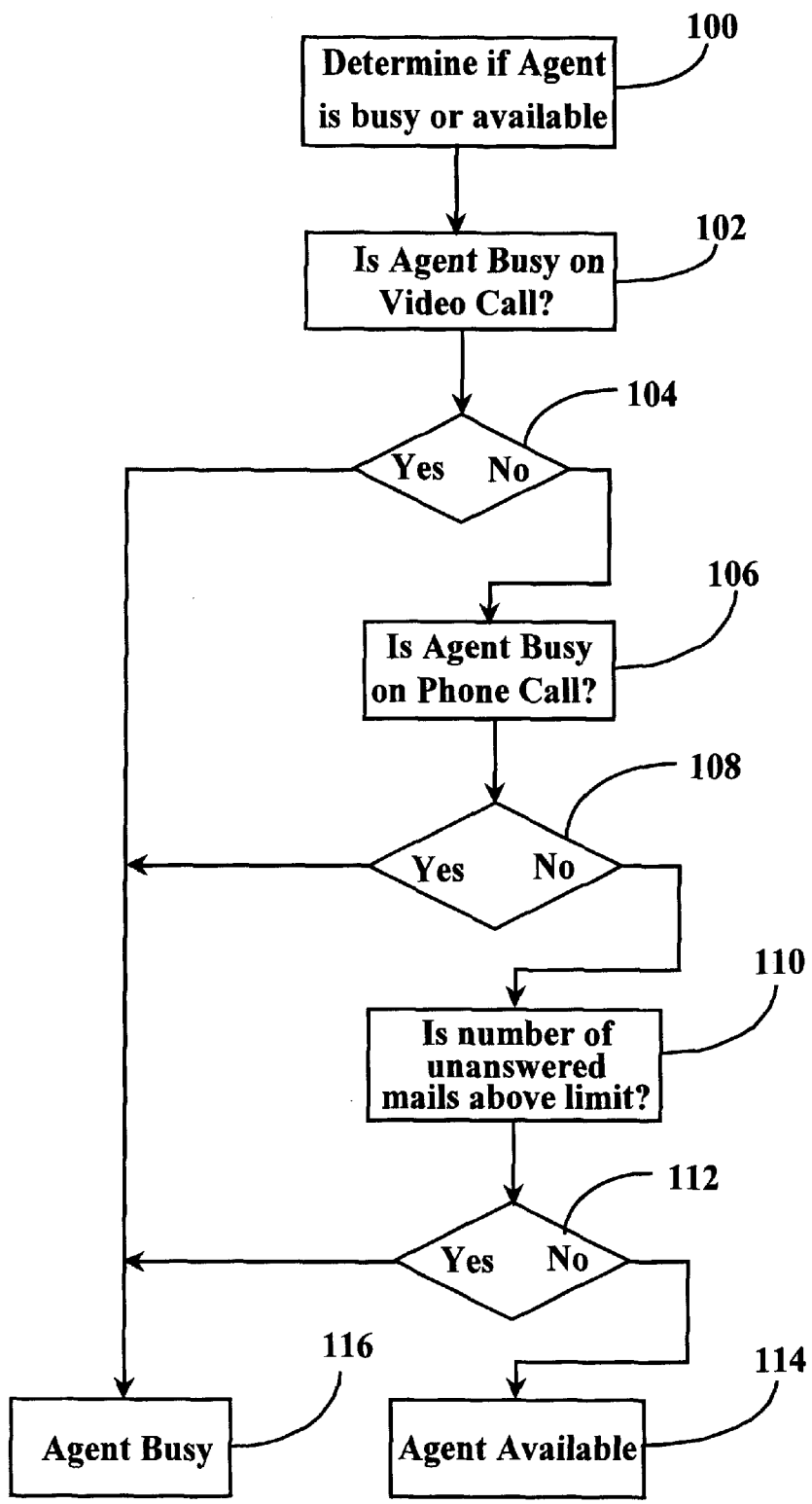
FIG. 1 is a flow diagram illustrating operative steps of an agent-status determination control routine according to an embodiment of the present invention.

FIG. 1 is a simplified flow diagram illustrating an agent-status-determination control routine according to an embodiment of the present invention. When this routine is called, operation begins at step 100. In this instant embodiment, an automated routine interfaces with routing software and covers three of the agents communication protocols. It will be apparent to one with skill in the art that a control routine such as this could be written to handle one communication protocol at a time or all communication protocols in automated fashion as shown. It will also be apparent to one with skill in the art that there are many additional communication parameters that could be included in the programming of a control routine such as the one described herein, such as voice mail, video mail, file transfer programs, etc. The flow diagram shown in this instant embodiment is meant to show only specific examples of many possibilities.

In a general sense, in considering all of the activities that may be encompassed by an agent's job description in a state-of-the-art multimedia call center, the activities (tasks) may be considered to fall in one or the other of two categories, these being agent engagement in a live network call, or agent engagement in a defined task responsibility other than a live network call. The first category of activity may be tracked in a call center by checking the state of the agent's equipment. If the agent is engaged in a live network call, that activity will involve his computer and/or his telephone, and this activity can be tracked quite simply.

The second category, all of those tasks not involved with live network calls, may involve many things, but will principally comprise answering messages of various sorts, such as electronically stored e-mail messages, voice mail, video mail and the like. This category, however, is not limited to answering stored messages, but can include many other administrative and routine tasks as well. Such tasks to be performed, for the purpose of the instant specification, will be deemed e-tasks, as stored in an electronic task list. Embodiments described below are exemplary, and not meant to be limiting.

Referring now to FIG. 1, an exemplary process is described. In step 102 the called routine checks if the agent is on a video call. If the agent is on a video call, the routine branches at step 104 and returns Agent Busy as a result at step 116. Processing then continues by whatever overall protocol is established. If it is determined that the agent is not on a video call in step 104, then branching at step 104 sends control to step 106. At step 106 the routine will check if the agent is on a voice phone call.

If it is determined the agent is on a voice call at step 106, branching at step 108 sends control to step 116, and the Busy determination is made. If it is determined in step 106 that the agent is not on a voice call, branching at step 108 sends control to step 110. At step 110 the routine checks the status of unanswered mails, such as e-mail messages. In a preferred embodiment of the invention a limit is set in respect to the number of unanswered mails there may be for an agent to be deemed. If it is determined that the number of unanswered mails is above the preset limit, branching at step 112 sends control to step 116, and the Busy result is returned.

If the level of mails is below the pre-set limit in step 110, then branching at step 112 is to step 114, and Agent Available is returned as a result.

It will be apparent to those with skill in the art that the approach of the example routine is novel, and that in the step of comparing an agent's e-tasks to a preset queue level, that there are a variety of activities in a job description and scope that might be checked. It will also be apparent that it is needed to include such duties in the Busy determination as call centers become more sophisticated relative to multimedia capability.

There are many possible embodiments wherein a control routine, such as the one described above, could be utilized without departing from the spirit and scope of the present invention. For example, it may be provided as a sub-routine integrated with routing software on dedicated routers. In one embodiment the control routine may be part of a routing application such as a personal desk-top router, known to the inventor, with part of the function controlled by agents such as the ability to set their own mail queue limits, etc.

Figure 2:
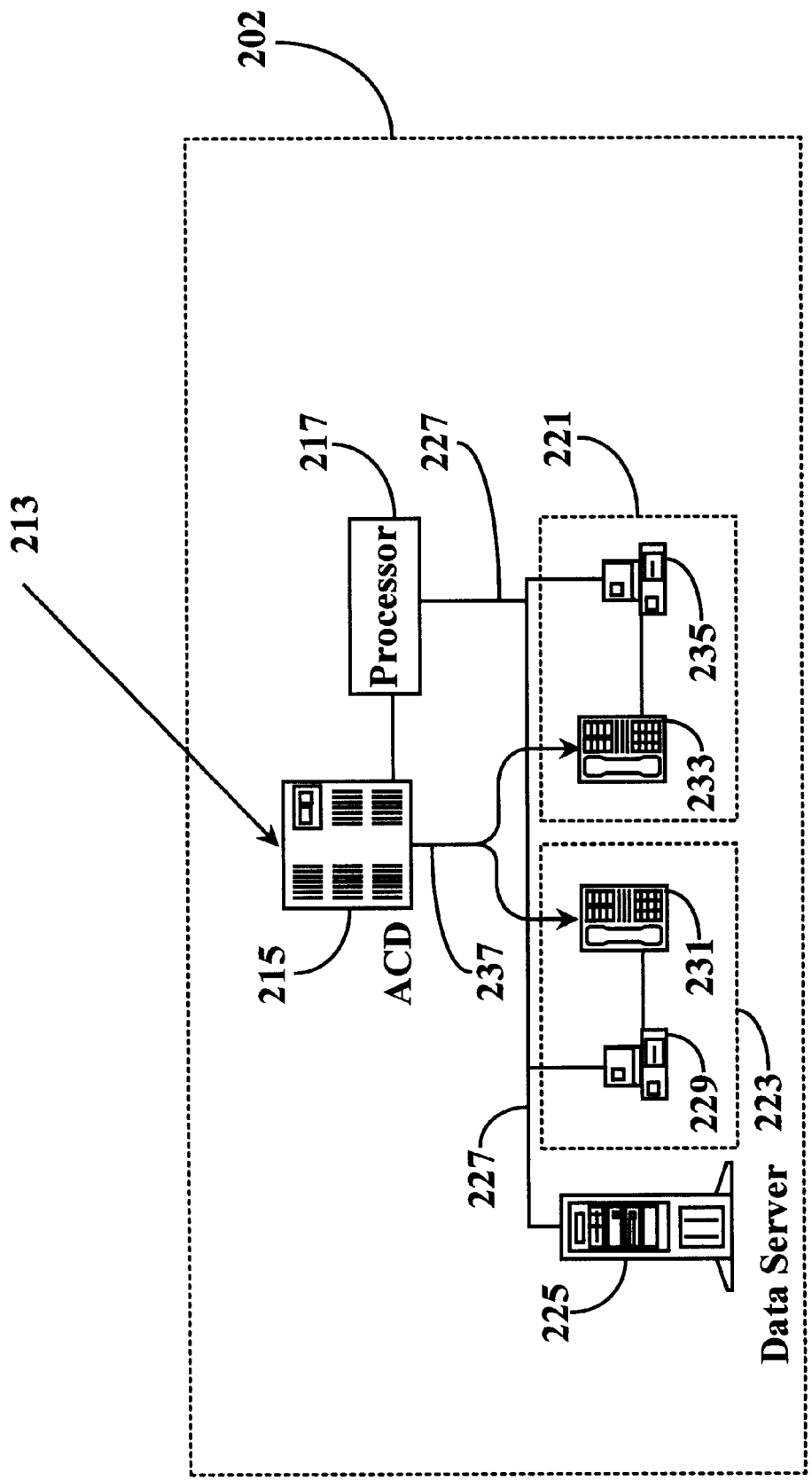
FIG. 2 is a typical call center environment enhanced with the software of FIG. 1 in an embodiment of the present invention.

FIG. 2 is a simple illustration of a typical call center service network 202 enhanced by the control routine of FIG. 1 in an embodiment of the present invention wherein incoming calls to a telephony switch 215 are represented by vector trunk 213. Additional elements such as a Service Control Point (SCP), Public Switch Telephone Network (PSTN), private networks, and so on are not presented here for the sake of simplicity.

Telephony switch 215 may be of the form of a Private Branch Exchange (PBX), or any other type of telephony switch known in the art and used by call centers. Generally, telephony switch 215 will be hosted by the company supporting the call center equipment 202, but other arrangements are known to the inventor and in the art.

In the embodiment of FIG. 2, a processor 217 is connected to telephony switch 215 via digital link 216. In an embodiment of the present invention processor 217 executes Computer-Telephony Integration (CTI) applications which monitor status of switch 215 and operate call-switching and the like in the switch. In some embodiments of the present invention an instance of the control routine of FIG. 1 could also be present and executable in processor 217 in conjunction with CTI applications.

Processor 217 is connected to agent's stations 221 and 223 via LAN 227, which connects also to a data server 225. Agent workstations 223 and 221 contain the necessary network-communication tools needed to operate in a call center environment such as PC/VDUs 229 and 235 and connected telephones 231 and 233. It will be apparent to one with skill in the art that there may be more than two agent workstations connected to a network such as the one described herein, however, two are shown here and deemed appropriate to adequately illustrate the present invention. Also, off-site agents may be connected.

It will be apparent to the skilled artisan that there are many configurations possible with regard to location of instances of the inventive control routine in the system of FIG. 2 or in other telephony systems. For example, in one embodiment an instance of the control routine may be installed on data server 225 with status reports continuously updated and accessible by routing program. In another embodiment, the control routine may be resident in processor 217 as described above.

To further illustrate the function of the control routine in accordance with an embodiment of the present invention, assume a hypothetical situation wherein an incoming call on trunk 213 arrives at telephony switch 215. It is known that data is typically received with, or in conjunction with the call or is collected using an IVR server. After determination of the purpose of the call is made from the data, it is determined by routing software that the best fit is the agent at station 221. The operating system of the call center calls the determination routine of FIG. 1, and checks on agent station 221.

Assume now that the level of unanswered mail messages present at agent workstation 221 is above the preset level at which an agent is to be deemed Busy. The control routine first checks agent workstation 221 and finds that the agent is not engaged on a voice or video call (any live network call), but his unanswered mail messages are above a preset level as described above. The control routine determines the agent at agent workstation 221 is busy. The next-best fit is the agent at station 223. The routine is called again and used to check station 223. The routine finds the phone lines at agent workstation 223 are free and the level of unanswered mail messages is below the preset level as described above. Therefore the agent at agent workstation 223 is determined to be available and the call is routed to the agent at station 223. Also, although not shown here, the system may flag the user that his task list is deemed keeping him busy, by using similar mechanisms as are used in scripting, to "walk him through" finishing his tasks.

It will be apparent to one with skill in the art that varying levels of interface and control could be given to either the agent or the system administrator with respect to the configuration of acceptable levels of unanswered mail messages that would be tolerated before other routing actions are initiated. For example, in some cases an agent may be given full control over the amount of unanswered mail messages that can be tolerated before he is determined to be available. In another embodiment, the control routine may temporarily disengage the agent's telephone and or video phone until the number of unanswered mail messages is below a pre-set level, thus eliminating the need to re-check the same agent repeatedly, and so on.

It will be apparent to one with skill in the art that the control routine of the present invention may be applied with varying configurations as might be required for differing scenarios. For example, the control routine may be applied only to a specific group of agents leaving other agents functioning under standard routing protocol. In another embodiment, agents may have the power to adjust the tolerated level of unanswered mail messages to a number that is in ratio to the number of incoming calls to the call center, and so on. These and other embodiments are possible, many of which have already been described.

It will also be apparent to the skilled artisan that there are many options in equipment, software, and connectivity that may be used in practicing the present invention in various embodiments. These options include all sorts of multi-media communication, including data network telephony such as Internet protocol telephony (IPT).

What is claimed is:

1. A method of determining Busy/Available status for an agent at an agent station in a call center, comprising the steps of:

(a) checking for an ongoing live network call at the agent station;

(b) checking an e-task queue at the agent station for uncompleted e-tasks; and (c) determining that the agent is available only if there is no ongoing live network call, and the level of uncompleted e-tasks in the e-task queue is below a predetermined level.

2. The method of claim 1 wherein the e-mail queue stores as e-tasks one or more electronic mail messages, voice mail messages, and video messages.

3. In a call center wherein agent tasks to be performed other than communication with clients are listed and monitored electronically, a method for determining an agent in a call center is either busy or available, comprising the steps of:

(a) determining if the agent is engaged in a live network call;

(b) presetting a comparison level for uncompleted tasks for the agent; and (c) determining that the agent is available only if the agent is not engaged in a live network call and the level of uncompleted tasks is below the preset comparison level.

4. The method of claim 3 wherein tasks other than communication with clients involves answering stored e-mails, and the level of uncompleted tasks comprises a number of unanswered e-mail messages.

5. A telephony system adapted to accomplish agent-level routing, comprising:

a router adapted for selecting a best-fit agent at an agent station for receiving an incoming call; and a call routine for determining if the best fit agent is available or busy;

wherein the agent is determined to be available only if the agent is not involved in a live network call and a level of uncompleted tasks is below a preset comparison level.

6. The telephony system of claim 5 wherein the router and the call routine operate at a call center comprising a telephony switch through which calls to agents are routed.

7. The telephony system of claim 6 wherein the call routine is executed on a computer-telephony integration (CTI) server connected to the telephony switch.

8. A multimedia-capable call center, comprising:

a telephony switch having a trunk line for receiving incoming calls and connected to telephones at agent stations;

a computerized management system for operating the call center;

computer stations with video display units (PC/VDUs) at individual ones of the agent stations, the PC/VDUs connected on a local area network (LAN) coupled to the telephony switch;

a storage system wherein a task list is stored for an agent to complete, and wherein the level of uncompleted tasks is accessible to the management system; and a routine adapted for determining Busy/Available status for an agent;

wherein the routine determines an agent as available only if the agent is not engaged in a live network call and the level of uncompleted tasks is below a preset level.

9. The call center of claim 8 wherein uncompleted tasks includes messages stored for an agent to answer, and the messages include one or more of voice mail, e-mail, and video mail messages.

10. A software routine for determining agent status in an agent-level routing system having an agent station equipped with a telephone and a computer station for communicating with clients, and a storage system for listing tasks for the agent station, the software routine comprising:

a protocol for determining active status of the telephone;

a protocol for checking for active communication with clients via the computer station; and a protocol for determining the level of uncompleted tasks in the storage system;

wherein the software routine returns Agent Busy if there is an active network call or the level of uncompleted tasks is above a preset level, and Agent Available if there is no active network call and the level of uncompleted tasks is at or below the preset level.

11. The routine of claim 10 wherein the protocol for determining the level of uncompleted tasks checks for unanswered messages, including one or more of voice mail, e-mail, and video mail messages.

* * * * *